United States Patent [19]
Shiraishi et al.

[11] Patent Number: 6,144,530
[45] Date of Patent: Nov. 7, 2000

[54] MAGNETIC HEAD APPARATUS WITH HEAD IC CHIP

[75] Inventors: Masashi Shiraishi; Masanori Sakai; Tsuyoshi Umehara; Haruyuki Morita; Ken-ichi Takano, all of Nagano, Japan

[73] Assignee: TDK Corporation, Tokyo, Japan

[21] Appl. No.: 09/198,914

[22] Filed: Nov. 24, 1998

[30] Foreign Application Priority Data

Dec. 24, 1997 [JP] Japan .................................. 9-365968

[51] Int. Cl.[7] .............................. G11B 21/16; G11B 5/60
[52] U.S. Cl. ......................... 360/244.1; 360/97.02
[58] Field of Search ........................ 360/97.02, 103, 360/104, 244.1

[56] References Cited

U.S. PATENT DOCUMENTS

| | | | |
|---|---|---|---|
| 4,616,279 | 10/1986 | Poorman | 360/103 |
| 4,642,716 | 2/1987 | Wakabayashi et al. | |
| 4,891,723 | 1/1990 | Zak | 360/106 |
| 5,528,819 | 6/1996 | McKay et al. | 29/603.07 |
| 5,711,063 | 1/1998 | Budde et al. | 29/603.06 |
| 5,712,747 | 1/1998 | Voldman et al | 360/103 |
| 5,956,211 | 9/1999 | Adley | 360/104 |
| 6,014,289 | 1/2000 | Goss | 360/104 |

FOREIGN PATENT DOCUMENTS

| | | |
|---|---|---|
| 0 484 906 A2 | 5/1992 | European Pat. Off. |
| 53-69623 | 6/1978 | Japan . |
| 55-150130 | 11/1980 | Japan . |
| 62-217476 | 9/1987 | Japan . |
| 63-292412 | 11/1988 | Japan . |
| 3-025717 | 2/1991 | Japan . |
| 3-108120 | 5/1991 | Japan . |
| 3-187295 | 8/1991 | Japan . |
| 11-195215 | 7/1999 | Japan . |

*Primary Examiner*—William Klimowicz
*Attorney, Agent, or Firm*—Arent Fox Kintner Plotkin & Kahn PLLC

[57] ABSTRACT

A magnetic head apparatus includes a slider with at least one magnetic head element, a suspension having one end portion, one surface and the other surface opposite to the one surface, for supporting the slider at the one end portion, a head IC chip mounted on the one surface of the suspension, and an air-cooled radiator member fixed on the other surface of the suspension.

12 Claims, 5 Drawing Sheets

MAGNETIC HEAD APPARATUS WITH HEAD IC CHIP

FIELD OF THE INVENTION

The present invention relates to a magnetic head apparatus which includes a slider with at least one thin-film magnetic head element, a resilient suspension for supporting the slider and a head IC chip.

DESCRIPTION OF THE RELATED ART

In such magnetic head apparatus, the thin-film magnetic head element for writing magnetic information into and/or reading magnetic information from a magnetic recording medium such as a magnetic disk is in general formed on the slider flying in operation above the magnetic recording medium. The slider is supported by the suspension made of a resilient thin metal plate extended from one end of a movable arm of a magnetic disk drive unit.

The head IC chip is used for amplifying writing current to the magnetic head element, for amplifying reading current from the head element and for controlling the writing and reading operations of the head element. The head IC chip had been mounted on the movable arm located in a rearward position of the suspension or on a flexible printed cable (FPC) at a rearward position of the suspension. However, if the IC chip is mounted on the movable arm or on the FPC, lead lines for electrically connecting the magnetic head element with the IC chip become long causing noises to be easily generated. Also, the long lead lines provide some delay in rising and falling times of pulse signals due to parasitic capacitance and inductance of these lead lines causing the high rate transfer of data to make difficult.

In order to suppress the generation of noises from the lead lines, Japanese patent unexamined publications nos. 53(1978)-69623 and 55(1980)-150130 propose a magnetic head apparatus wherein the length of the lead lines is shortened by mounting the head IC chip on the slider or on the suspension.

However, if the IC chip is mounted on the slider or on the suspension, the IC chip itself is heated to a high temperature due to the writing current flowing through the IC chip during recording operation. This generated heat from the head IC chip will exert an influence upon the magnetic head element. That is, when the head IC chip is mounted on the movable arm, the temperature of the IC chip can be maintained at a low value because the movable arm has sufficient heat capacity and heat dissipation area. In addition, the magnetic head element will not receive the influence of the generated heat because the IC chip locates far from the magnetic head element. Whereas, when the IC chip is mounted on the slider or on the suspension, sufficient surface area for dissipating heat generated from the IC chip cannot be obtained and also the reduction of heat during heat conduction cannot be expected. Thus, the temperature of the IC chip itself increases causing a degree of reliability of the IC chip to lower and the magnetic head element will receive the influence of the generated heat.

Furthermore, if physical shock is applied to the magnetic head apparatus in which the head IC chip is mounted on the slider or on the suspension, the suspension will greatly deflect causing that the slider may come into collision with the magnetic recording medium.

SUMMARY OF THE INVENTION

It is therefore an object of the present invention to provide a magnetic head apparatus, whereby increase in temperature of a head IC chip can be suppressed.

Another object of the present invention is to provide a magnetic head apparatus with an improved shock resistance.

According to the present invention, a magnetic head apparatus includes a slider with at least one magnetic head element, a suspension having one end portion, one surface and the other surface opposite to the one surface, for supporting the slider at the one end portion, a head IC chip mounted on the one surface of the suspension, and an air-cooled radiator member fixed on the other surface of the suspension.

Since the air-cooled radiator member is attached to the rear surface of the suspension opposite to the surface on which the head IC chip is mounted, the heat generated form the IC chip will be easily dissipated through the suspension and the radiator member. Thus, the IC chip can be effectively cooled and increase in temperature of the chip can be prevented even when the write current is flowing. As a result, excellent reliability of IC operation can be expected.

It is preferred that the suspension includes a load beam with one surface which faces in operation to a magnetic recording medium, and a flexure formed on the one face of the load beam, the slider and the head IC chip being mounted on the flexure.

It is also preferred that the air-cooled radiator member has a plurality of recessed grooves running along a longitudinal direction of the suspension. Since the recessed grooves run along the longitudinal direction of the suspension, the suspension will possess high stiffness against longitudinal bending force resulting shock resistance of the suspension to improve. Thus, even if physical shock is applied, the suspension never greatly deflects to cause no collision of the slider with the magnetic recording medium surface.

In embodiments of the present invention, the air-cooled radiator member may have a corrugated shape with wave fronts running along a longitudinal direction of the suspension, or a plurality of cooling fins running along a longitudinal direction of the suspension.

It is preferred that the head IC chip is mounted on the one surface of the suspension so that a part of the IC chip exists within or very close to a region in which the radiator member fixed on the other surface exists.

It is also preferred that the air-cooled radiator member is a discrete component attached to the suspension. In this case, more preferably, the air-cooled radiator member is made of a material with high heat conductivity.

It is preferred that the air-cooled radiator member is an integral part of the suspension fabricated by machining, by pressing or by die casting the suspension itself. In this case, the suspension includes a load beam with one surface which faces in operation to a magnetic recording medium, and a flexure formed on the one face of the load beam, the slider and the head IC chip being mounted on the flexure. The air-cooled radiator member is an integral part of the load beam fabricated by machining or by the load beam itself.

Further objects and advantages of the present invention will be apparent from the following description of the preferred embodiments of the invention as illustrated in the accompanying drawings.

DESCRIPTION OF THE PREFERRED EMBODIMENTS

Figure 1:
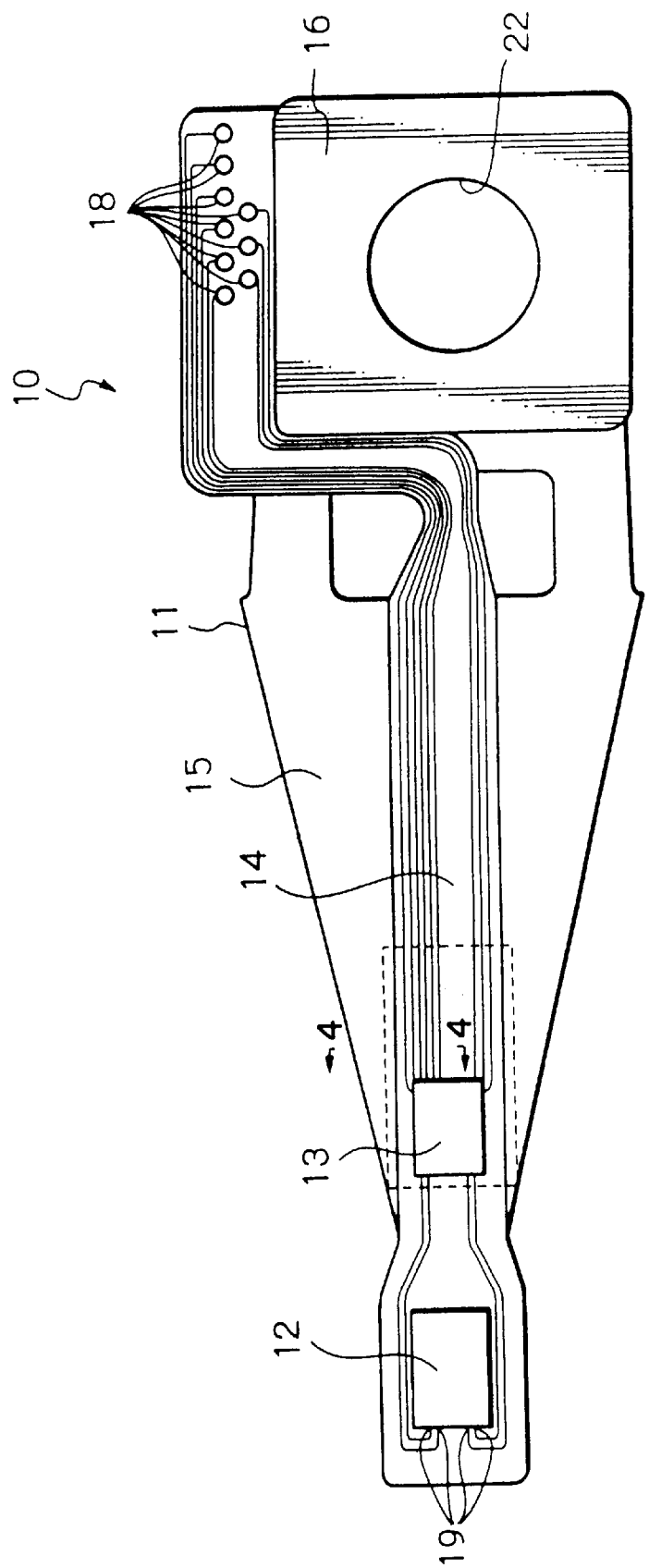
FIG. 1 shows a plane view, seen from a slider-attached surface side, of a preferred embodiment of a magnetic head apparatus according to the present invention.
Figure 2:
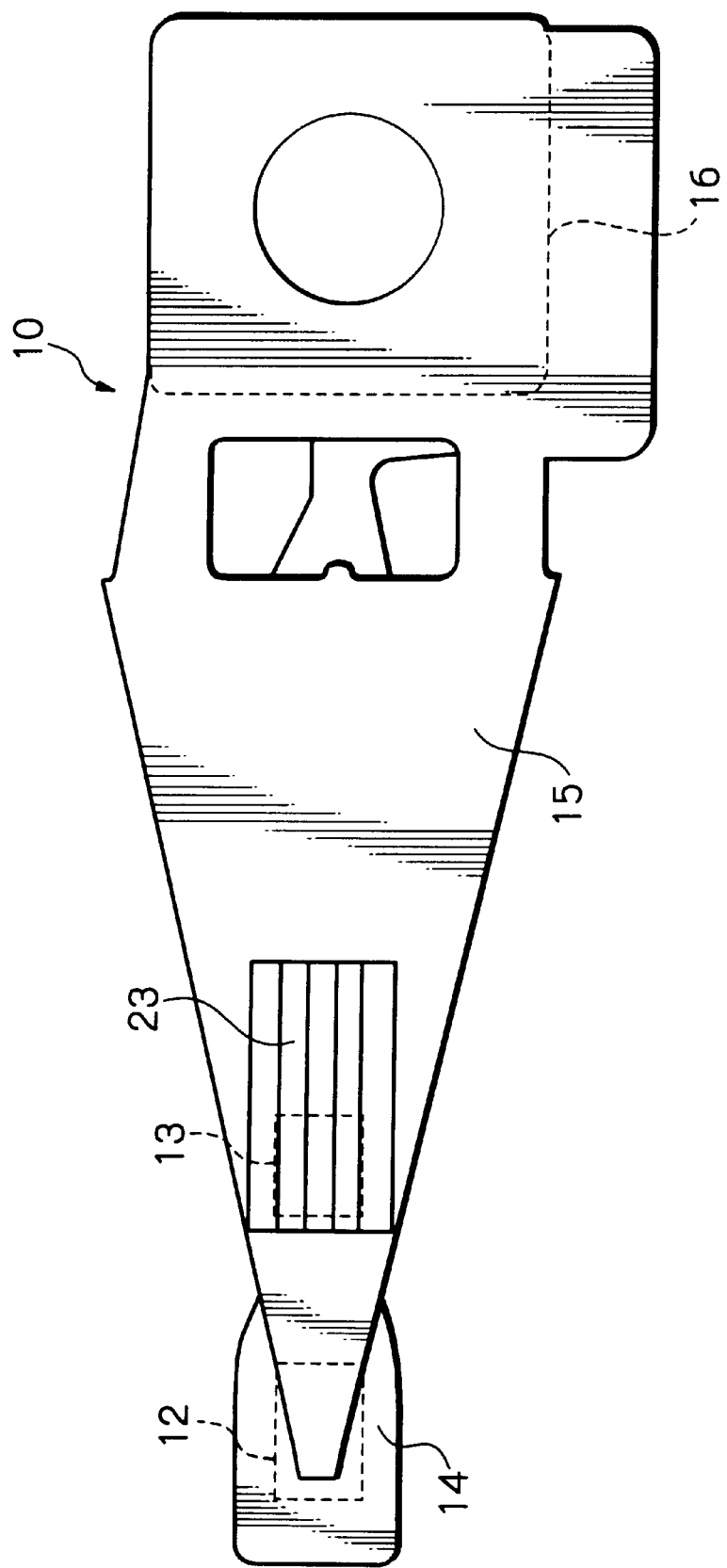
FIG. 2 shows a plane view, seen from the opposite side of the slider-attached surface side, of the magnetic head apparatus shown in FIG. 1.
Figure 3:
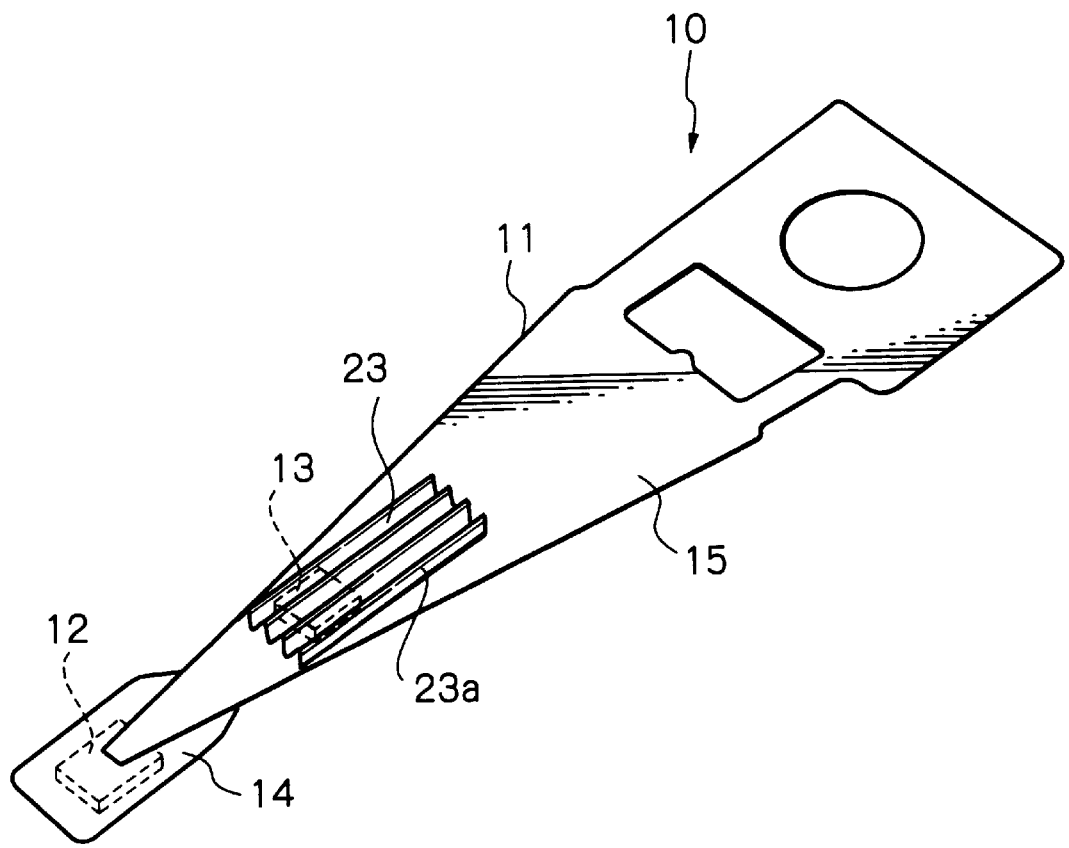
FIG. 3 shows an oblique view, seen from the opposite side of the slider-attached surface side, of the magnetic head apparatus shown in FIG. 1.
Figure 4:
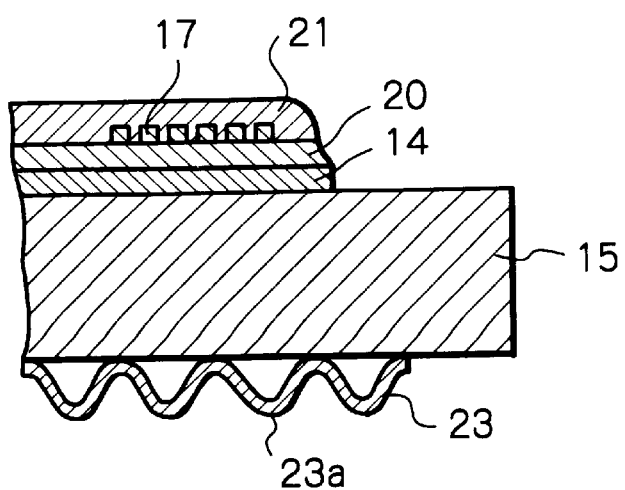
FIG. 4 shows a sectional view seen from 4—4 line of FIG. 1.
Figure 5:
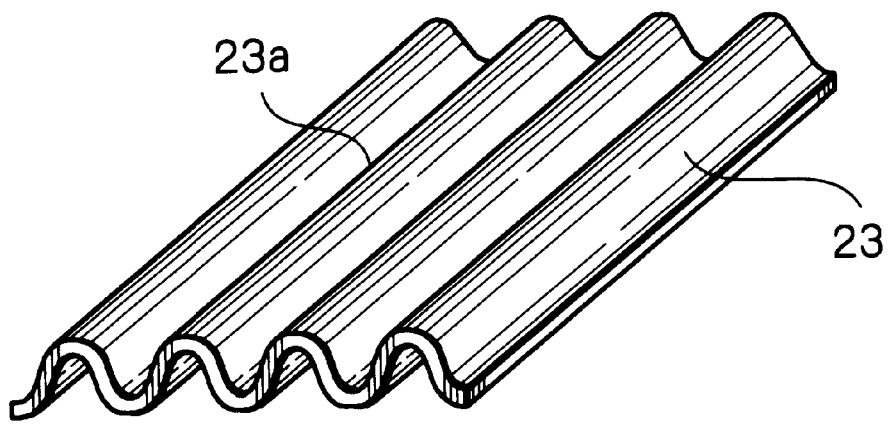
FIG. 5 shows an oblique view illustrating an example of an air-cooled radiator member of the embodiment of FIG. 1.

FIG. 1 illustrates a slider-attached surface of a magnetic head apparatus as a preferred embodiment of the present invention, FIGS. 2 and 3 illustrate the opposite surface of the slider-attached surface of this apparatus, FIG. 4 illustrates an 4—4 line section of the apparatus, and FIG. 5 illustrates an air-cooled radiator member of this apparatus.

In these figures, reference numeral 10 denotes a head-suspension assembly corresponding to the magnetic head apparatus according to the present invention. The head-suspension assembly is assembled by fixing a slider 12 having a magnetic head element to a top end portion of a suspension 11, and by mounting a head IC chip 13 on a middle portion of this suspension 11. The slider 12 and the head IC chip 13 are fixed on a surface of the suspension 11, which opposes to the magnetic disk surface. This surface of the suspension is called hereinafter as a slider-attached surface.

As shown in FIG. 1, the suspension 11 is substantially constituted by a resilient flexure 14 which carries the slider 12 at its tang located near its top end portion and supports the head IC chip 13 at its middle portion, a load beam 15 which supports and fixes the flexure 14, and a base plate 16 formed at a base end portion of the load beam 15.

The flexure 14 is made of in this embodiment a stainless steel plate (for example SUS304TA) with a thickness of about 25 μm.

A conductor layer of a thin-film pattern 17 that constitutes necessary number of lead lines is formed on the flexure 14 along its length. One end of the conductor layer 17 (the base plate 16 side) is connected to connection terminals 18 connected to external circuits, and the other end of the conductor layer 17 is connected to connection terminals 19 formed at the top end portion of the flexure 14.

The thin-film conductive pattern can be formed by a well-known method similar to the patterning method of forming a printed circuit board on a thin metal plate. Namely, as shown in FIG. 4, the conductive pattern is formed by sequentially depositing a first insulation material layer 20 made of a resin such as polyimide with a thickness of about 5 μm, a patterned Cu layer (conductive layer) 17 with a thickness of about 4 μm, and a second insulation material layer 21 made of a resin such as polyimide with a thickness of about 5 μm on the flexure 14 in this order. Within the regions of the connection terminals 18 and 19, a Ni layer and an Au layer are sequentially deposited on the Cu layer and there is no second insulation material layer 21.

In order to easily understand the structure, the conductor layer 17 is indicated by solid lines in FIG. 1.

The load beam 15 is made of in this embodiment a stainless steel plate with a thickness of about 70–75 μm and supports the flexure 14 along its whole length. This load beam 15 has a shape with a width that narrows with approaching to its top end. Fixing of the flexure 14 to the load beam 15 is achieved by means of a plurality of welded spots.

The base plate 16 is made of a stainless steel or iron and is fixed to the base end portion of the load beam 15 by means of welded spots. The suspension 11 is attached to a movable arm (not shown) by fixing an attachment part of the base plate 16 to the movable arm.

As aforementioned, the slider 12 with the magnetic head element is mounted on the second insulation material layer 21 formed on the flexure 14 at the top end portion of the suspension 11. The conductor layer 17 which constitutes the necessary number of lead lines passes both sides of the slider 12 and turns back at the top end portion of the flexure 14 to the connection terminals 19 so as to electrically connect with input/output electrodes of the slider 12. The conductor layer 17 is covered by the insulation material layer made of the resin. In modification, a dimple may be formed between the load beam 15 and the flexure 14 at a position on which the slider 12 is mounted.

The head IC chip 13 is mounted on the slider-attached surface at the middle length portion of the suspension 11. The head IC chip 13 has preferably a lightweight of 1 mg or less. Thanks to the lightweight of the IC chip, even if the IC chip 13 is mounted on the suspension 11, it can be expected to produce little ill effect to mechanical oscillation characteristics of this suspension 11.

The head IC chip 13 in this embodiment is formed by a bear chip and mounted on and connected to the conductor layer 17 which is formed on the flexure 14 of the suspension 11 via the first insulation material layer 20 by the flip chip bonding.

An insulation material layer with a good heat conductivity, made of for example mixture of a resin such as polyamide and insulation material, is filled between the bottom surface of the IC chip 13 and the first and second insulation material layers 20 and 21. Thus, heat generated from the IC chip 13 can be easily dissipated through the filled insulation material layer into the suspension 11.

An air-cooled radiator member 23 is mounted on the rear surface opposite to the slider-attached surface of the suspension 11 or the load beam 15. According to the present invention, the radiator member 23 is attached to the rear surface so that at least a part of the radiator member 23 overlays on the IC chip 13. In other words, the IC chip 13 is mounted on the slider-attached surface of the suspension 11 so that a part of the IC chip 13 exists within or very close to a region in which the radiator member 23 attached on the opposite surface exists. The embodiment of FIGS. 1 to 5 is a desired model wherein the IC chip 13 is completely superimposed within the region the radiator member 23 exists.

The air-cooled radiator member 23 in this embodiment is, as illustrated in FIG. 5, a discrete corrugated metal plate with large surface area and high heat conductivity. The radiator member 23 may be made of for example Ni plated Al or Cu, duralumin or stainless steel. This corrugated plate is fixed on the rear surface of the suspension 11 so that its wave fronts 23a run along the longitudinal direction of the suspension 11.

Since the air-cooled radiator member 23 with the corrugate shape or recessed grooves which has large surface area is attached to the rear surface of the suspension 11 at the position the head IC chip 13 is mounted on the opposite surface, the heat generated from the IC chip 13 will be easily dissipated through the suspension 11 and the radiator member 23. Thus, the IC chip 13 can be effectively cooled and increase in temperature of the chip can be prevented even when the write current is flowing. As a result, high degree of reliability of IC operation can be expected.

Furthermore, since the radiator member 23 is fixed to the load beam 15 so that its corrugated wave fronts 23a run along the longitudinal direction of the suspension 11, stiffness of this load beam 15 can be increased. Therefore, the suspension 11 possesses high stiffness against longitudinal bending force resulting shock resistance of the suspension 11 to improve. Thus, even if physical shock is applied, the suspension 11 never greatly deflects to cause no collision of the slider 12 with the magnetic disk surface.

Figure 6:
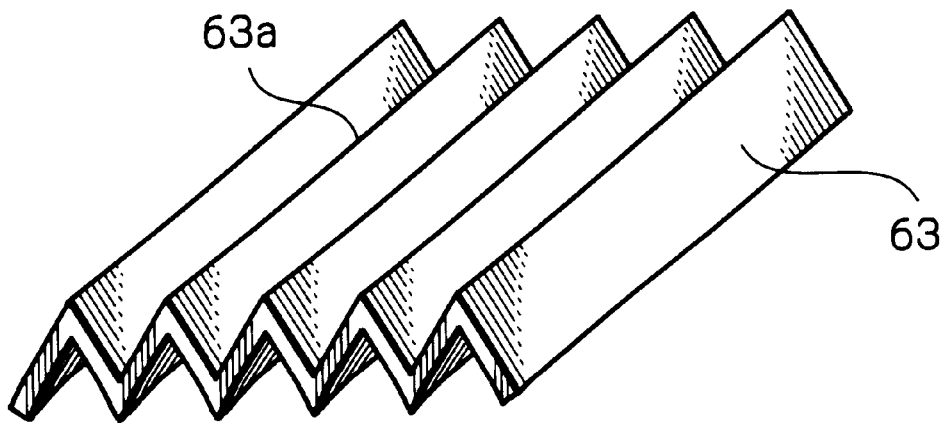
FIG. 6 shows an oblique view illustrating another example of an air-cooled radiator member of the embodiment of FIG. 1.
Figure 7:
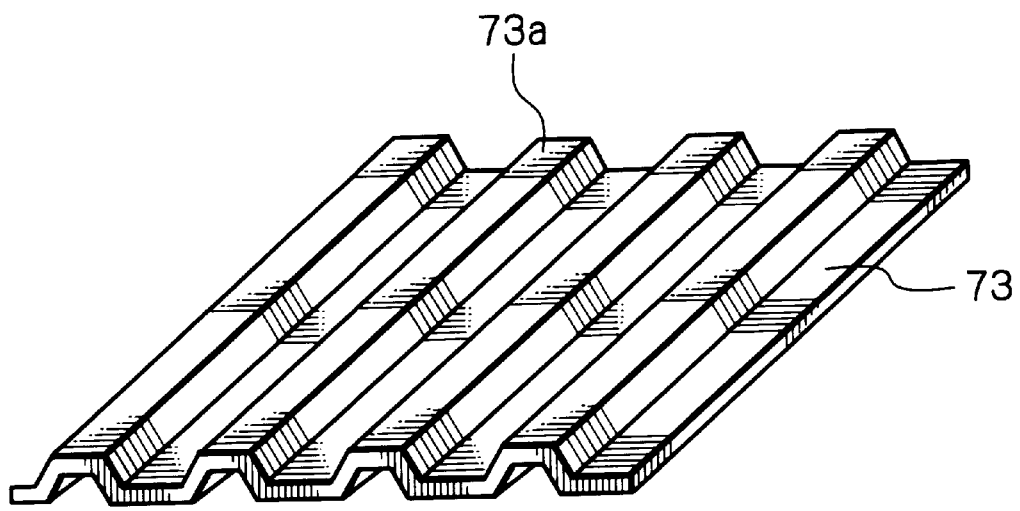
FIG. 7 shows an oblique view illustrating further example of an air-cooled radiator member of the embodiment of FIG. 1.

The shape of the air-cooled radiator member according to the present invention may be modified as shown in FIGS. 6 and 7, for example. That is, a radiator member 63 shown in FIG. 6 has triangular sectional shape in its wave fronts 63a, and a radiator member 73 shown in FIG. 7 has trapezoidal sectional shape in its wave fronts 73a.

Figure 8:
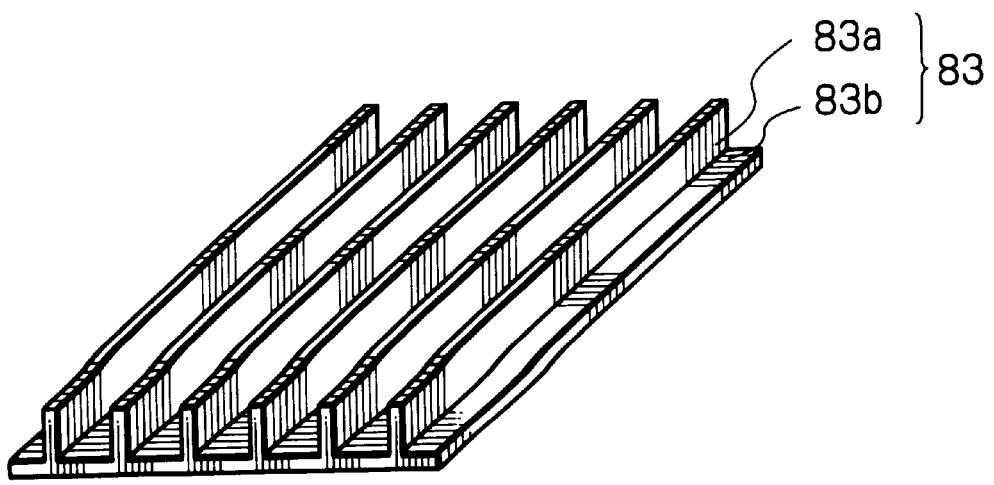
FIG. 8 shows an oblique view illustrating an example of an air-cooled radiator member of another embodiment according to the present invention.

FIG. 8 shows an oblique view illustrating an example of an air-cooled radiator member of another embodiment according to the present invention. In this embodiment, constitutions of a suspension, a slider and a head IC chip are the same as those of the embodiment of FIG. 1, but structure of an air-cooled radiator member 83 is different from that of the radiator member 23 in the embodiment of FIG. 1.

As will be apparent from FIG. 8, a flat plate 83b and a plurality of cooling fins 83a arranged in parallel on the plate 83b constitute the air-cooled radiator member 83. A discrete corrugated metal plate with large surface area and high heat conductivity also forms the air-cooled radiator member 83 in this embodiment. The radiator member 83 may be made of for example Ni plated Al or Cu, duralumin or stainless steel. The flat plate 83b is fixed on the rear surface of the suspension 11 so that the cooling fins 83a run along the longitudinal direction of the suspension 11. The radiator member 83 is attached to the rear surface so that at least a part of the radiator member 83 overlays on the IC chip 13. In other words, the IC chip 13 is mounted on the slider-attached surface of the suspension 11 so that a part of the IC chip 13 exists within a region in which the radiator member 83 attached on the opposite surface exists.

Since the radiator member 83 with the cooling fins 83a which has large surface area is attached to the rear surface of the suspension 11 at the position the head IC chip 13 is mounted on the opposite surface, the heat generated from the IC chip 13 will be easily dissipated through the suspension 11 and the radiator member 83. Thus, the IC chip 13 can be effectively cooled and increase in temperature of the chip can be prevented even when the write current is flowing. As a result, excellent reliability of IC operation can be expected.

Furthermore, since the radiator member 83 is fixed to the load beam 15 so that its fins 83a and therefore recessed grooves run along the longitudinal direction of the suspension 11, stiffness of this load beam 15 can be increased. Therefore, the suspension 11 possesses high stiffness against longitudinal bending force resulting shock resistance of the suspension 11 to improve. Thus, even if physical shock is applied, the suspension 11 never greatly deflects to cause no collision of the slider 12 with the magnetic disk surface.

In the aforementioned embodiments, the magnetic head apparatus is fabricated by fixing a discrete air-cooled radiator member to the suspension. However, machining, pressing or die casting the load beam itself may form the similar radiator member. In the latter case, since no radiator member is added, the suspension can be kept at lightweight resulting mechanical oscillation properties of the suspension to maintain good.

The air-cooled radiator member of the magnetic head apparatus according to the present invention can be formed in various shapes with a large surface area other than the above-mentioned corrugated shapes and the shape with the cooling fins. Particularly, if the radiator member has recessed grooves running along the longitudinal direction of the suspension, the suspension will possess high stiffness against longitudinal bending force resulting shock resistance of the suspension to improve.

Many widely different embodiments of the present invention may be constructed without departing from the spirit and scope of the present invention. It should be understood that the present invention is not limited to the specific embodiments described in the specification, except as defined in the appended claims.

What is claimed is:

1. A head suspension assembly comprising:

a slider with at least one magnetic head element;

a resilient suspension having a first end portion for connection to a movable arm and a second end portion for supporting said slider;

a head IC chip mounted on a surface of the suspension between the first and second end portions; and an air-cooled radiator member fixed on a surface of the suspension opposite said head IC chip.

2. The assembly as claimed in claim 1, wherein said air-cooled radiator member has a plurality of recessed grooves running along a longitudinal direction of said suspension.

3. The assembly as claimed in claim 2, wherein said air-cooled radiator member has a corrugated shape with wave fronts running along a longitudinal direction of said suspension.

4. The assembly as claimed in claim 2, wherein said air-cooled radiator member has a plurality of cooling fins running along a longitudinal direction of said suspension.

5. The assembly as claimed in claim 1, wherein said head IC chip is mounted on said surface of the suspension so that a part of the IC chip exists within or very close to a region in which said radiator member fixed on the opposite surface exists.

6. The assembly as claimed in claim 1, wherein said air-cooled radiator member is a discrete component attached to the suspension.

7. The assembly as claimed in claim 6, wherein said air-cooled radiator member is made of a material with high heat conductivity.

8. The assembly as claimed in claim 1, wherein said air-cooled radiator member is an integral part of said suspension fabricated by machining the suspension itself.

9. The assembly as claimed in claim 8, wherein said suspension includes a load beam with one surface which faces in operation to a magnetic recording medium, and a flexure formed on said one face of the load beam, said slider and said head IC chip being mounted on said flexure, and wherein said air-cooled radiator member is an integral part of said load beam fabricated by machining the load beam itself.

10. The assembly as claimed in claim 1, wherein said suspension includes a load beam with one surface which faces in operation to a magnetic recording medium, and a flexure formed on said one face of the load beam, said slider and said head IC chip being mounted on said flexure.

11. The head suspension assembly of claim 1, wherein said head IC chip is mounted on a middle portion of said suspension.

12. The head suspension assembly of claim 1, further comprising conductor layers connected at one end to connection terminals for connection to external circuits and connected at a second end to connection terminals for connection to said slider.

* * * * *